: US 8,090,795 B2
(45) Date of Patent: Jan. 3, 2012

(12) United States Patent
Manwaring et al.

(54) SYSTEMS AND METHODS FOR DISTRIBUTING MEDIA CONTENT

(75) Inventors: Philip K. Manwaring, Mobile, AL (US); David R. Van Gorder, Greensboro, NC (US)

(73) Assignee: Integrity Media, Inc., Mobile, AL (US)

( * ) Notice: Subject to any disclaimer, the term of this patent is extended or adjusted under 35 U.S.C. 154(b) by 481 days.

(21) Appl. No.: 12/236,856

(22) Filed: Sep. 24, 2008

(65) Prior Publication Data

US 2009/0083386 A1 Mar. 26, 2009

Related U.S. Application Data

(60) Provisional application No. 60/974,749, filed on Sep. 24, 2007.

(51) Int. Cl.
G06F 15/16 (2006.01)
G06Q 30/00 (2006.01)

(52) U.S. Cl. .......................... 709/217; 705/26.1
(58) Field of Classification Search .......... 709/217–219, 709/231; 704/278; 84/609, 666, 610–613; 705/26–27, 25
See application file for complete search history.

(56) References Cited

U.S. PATENT DOCUMENTS 6,466,918 B1 * 10/2002 Spiegel et al. .................. 705/27
7,778,929 B2 * 8/2010 Corbett ........................... 705/59
2002/0002541 A1 1/2002 Williams
2002/0198944 A1 * 12/2002 Moss ............................ 709/206
2003/0014262 A1 * 1/2003 Kim ............................... 704/278
2003/0115349 A1 * 6/2003 Brinkman et al. ............ 709/231
2004/0098315 A1 * 5/2004 Haynes et al. ................. 705/26
2005/0097139 A1 * 5/2005 Appelstal ...................... 707/200
2006/0239131 A1 * 10/2006 Nathan et al. .............. 369/30.06
2007/0219949 A1 9/2007 Mekikian
2007/0220095 A1 * 9/2007 Silver et al. .................. 709/206
2007/0220566 A1 9/2007 Ahmad-Taylor

OTHER PUBLICATIONS

International Search Report dated Dec. 5, 2008, PCT patent application No. PCT/US08/11072, filed Sep. 24, 2008.

* cited by examiner

Primary Examiner — Chirag Patel
(74) Attorney, Agent, or Firm — Alston & Bird LLP

(57) ABSTRACT

Various embodiments of the present invention relate generally to methods and systems for distributing media resources used for worship services. In particular, various embodiments provide systems and methods that include a library of diverse types of media resources and an interface through which a user searches the library for diverse sets of media resources based on a theme, such as the topic of a particular worship service. In addition, various embodiments allow the user to select and purchase one or more media resources displayed in the diverse sets of media resources found during the search. Furthermore, various embodiments allow the user to distribute the purchased media resources to one or more individuals. In various embodiments, the distribution may be performed by e-mailing the resources, downloading the resources, providing a link to the resources, physically mailing a copy of the resources, or any combination thereof.

32 Claims, 13 Drawing Sheets

ACCOUNT REGISTRATION

ACCOUNT INFO

CLUB LEVEL*  PLAN A LEVEL-20 DOWNLOADS EACH MONTH
             $14.99/MONTH

PLAN B LEVEL-70 DOWNLOADS EACH MONTH
             $29.99/MONTH

A LA CARTE LEVEL
                 PAY AS YOU GO/DOWNLOAD

YOUR LOGIN WILL BE YOUR EMAIL ADDRESS

LOGIN

PASSWORD*

CONFIRM PASSWORD*

FIG. 2

SYSTEMS AND METHODS FOR DISTRIBUTING MEDIA CONTENT

CROSS-REFERENCE TO RELATED APPLICATIONS

This application claims the benefit of U.S. Provisional Application Ser. No. 60/974,749, filed Sep. 24, 2007, the contents of which are incorporated herein by reference in its entirety.

FIELD OF THE INVENTION

Various embodiments of the present invention relate generally to methods and systems for distributing media resources used for worship services, and more particularly, to methods and systems that provide a library of diverse types of media resources and an interface through which a user may search the library based on a theme and select and purchase one or more media resources displayed in the diverse sets of media resources found during the search.

BACKGROUND

Church services provide a formalized period of communal worship. Though styles of service vary greatly among different sects of Christianity and other religions, many services involve some form of music. For example, many services involve the ringing of a bell and/or the singing of hymns or other inspiring music. In many services, the hymns may be sung by a choir or simply by the congregation accompanied by an organ. Sometimes other instruments, such as a piano, guitar, or other modern band instruments, may be used as well.

The coordination of a church service can involve many different facets. For instance, many individuals will write a sermon, and in addition, choose scripture verse, psalms, and music to accompany the sermon. This can be time consuming, not only in regard to writing the sermon, but also in finding the accompanying music, scripture verse, and psalms. The process of coordinating music to be performed by a choir or band during the service can also be time consuming. For example, the individual may first need to find the accompanying musical piece and then spend further time trying to find sheet music to provide to the choir for the piece or accompanying instruments parts. Thus, a need exists that would allow an individual, such as a minister or a priest, to search, organize, and manage resources that are used for worship services. In addition, a need exists that would allow an individual to choose a resource used for a worship service and to be able to further find and distribute any additional resources needed to accompany the resource.

BRIEF SUMMARY OF VARIOUS EMBODIMENTS OF THE INVENTION

A computer system for distributing media files according to a particular embodiment of the invention comprises computer memory for storing a library of diverse types of media files and a computer user interface through which a user performs a search of the library of media files, wherein: (1) the computer system is adapted to facilitate the purchase, by a user, of one or more of the media files identified in the search; (2) the library comprises both music files and one or more other types of files (e.g., sheet music files); and (3) a first of the music files is a first accompaniment version of a particular song, the first accompaniment version of the particular song being a version of the particular song in which a first subset of at least one instrument part included in an original version of the song is omitted from the first accompaniment version.

In particular embodiments, at least one of the sheet music files comprises sheet music for at least one of the first subset of one or more instrument parts for the song. Also, in various embodiments, the system is further adapted to: (1) store information regarding a first band member instrument, the first band member instrument being played by a first member of a particular band; (2) store information regarding a second band member instrument, the second band member instrument being played by a second member of the band; (3) distribute the accompaniment version of the particular song to both the first member of the band and the second member of the band; (4) distribute a first of the sheet music files to the first band member, the first sheet music file corresponding to the first band member instrument; and (5) distribute a second of the sheet music files to the second band member, the second sheet music file corresponding to the second band member instrument.

A computer system for distributing media files according to a further embodiment of the invention comprises memory storing a library of diverse types of media files; and a computer user interface through which a user performs a search of the library of media files, wherein the computer system is adapted to allow a user to search the library of media files on the basis of: theme, passage of religious text, and/or tempo.

A computer system for distributing media files according to yet another embodiment of the invention comprises memory storing a library of diverse types of media files; and a computer user interface through which a user performs a search of the library of media files, wherein: (1) the computer system is adapted to facilitate the purchase, by the user, of one or more of the media files identified in the search; (2) the computer system stores information regarding each of a group of individuals; (3) the information comprises a designated format preference and designated contact information for each particular individual within the group of individuals; and (4) the computer system is further adapted for, in response to receiving a request to distribute one or more particular media files to the group of individuals, distributing each of the one or more particular media files to each respective individual in the group of individuals based on the stored contact information and the format preference for the respective individual.

BRIEF DESCRIPTION OF THE SEVERAL VIEWS OF THE DRAWINGS

Figure 1:
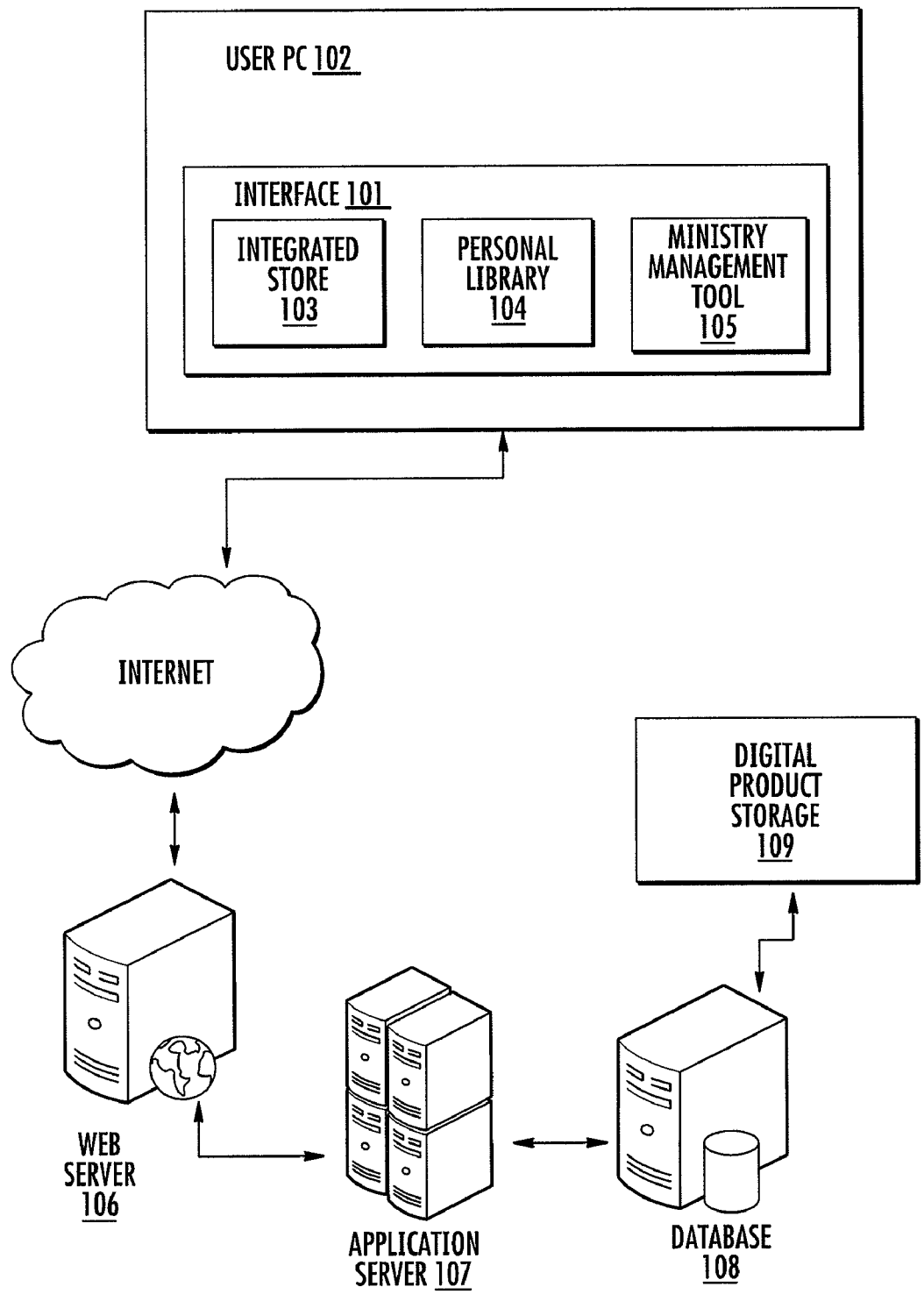

Having thus described the invention in general terms, reference will now be made to the accompanying drawings, which are not necessarily drawn to scale, and wherein:

FIG. 1 is a schematic diagram illustrating a system for distributing media resources used for worship services according to an embodiment of the invention.

FIG. 2 is an example of a registration screen according to an embodiment of the invention.

Figure 3:
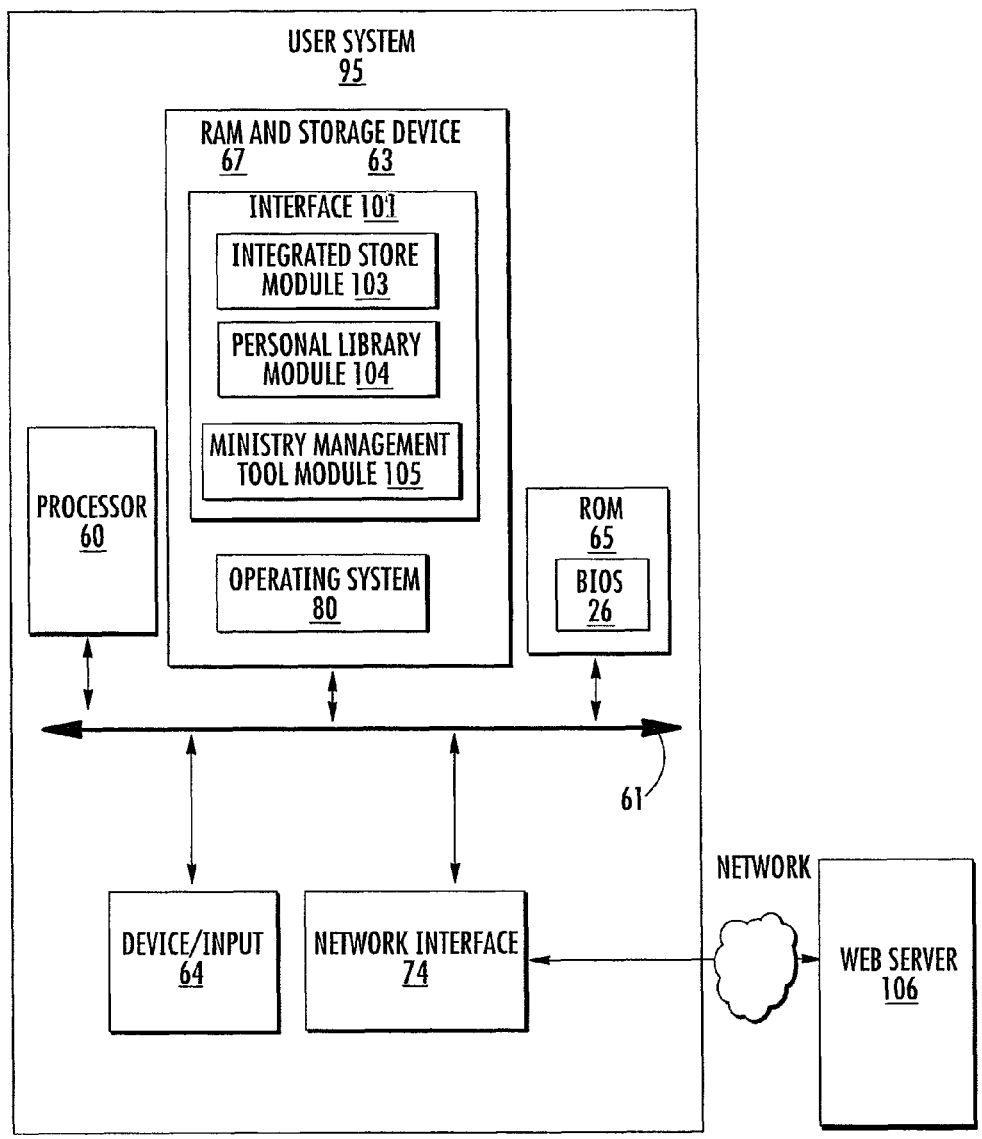

FIG. 3 is a schematic diagram illustrating a user's system according to an embodiment of the invention.

Figure 4:
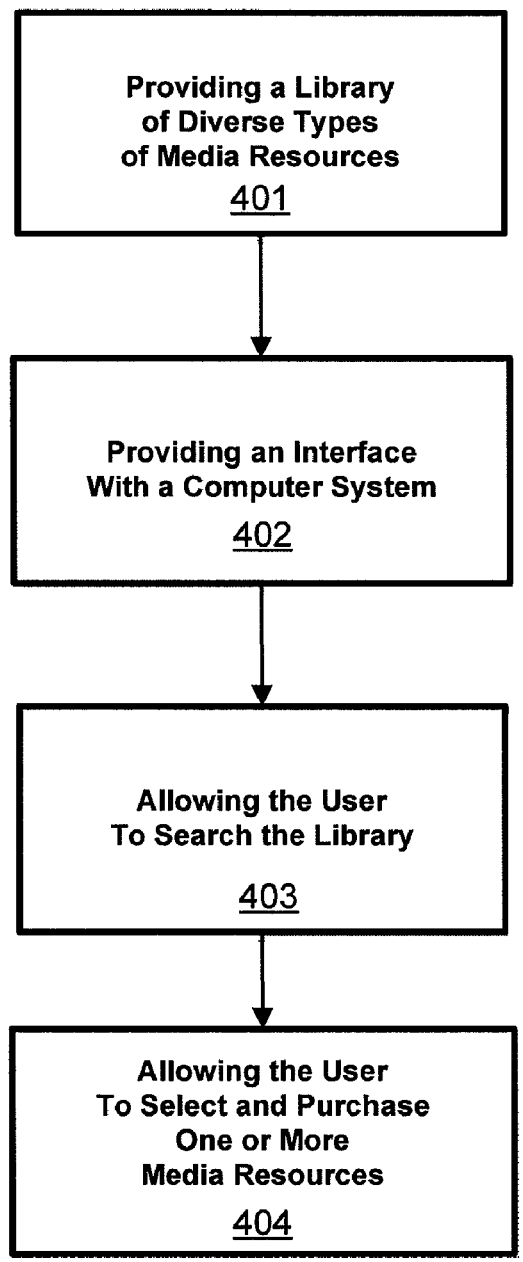

FIG. 4 is a flow chart illustrating a process for distributing media resources used for worship services according to an embodiment of the invention.

Figure 5A:
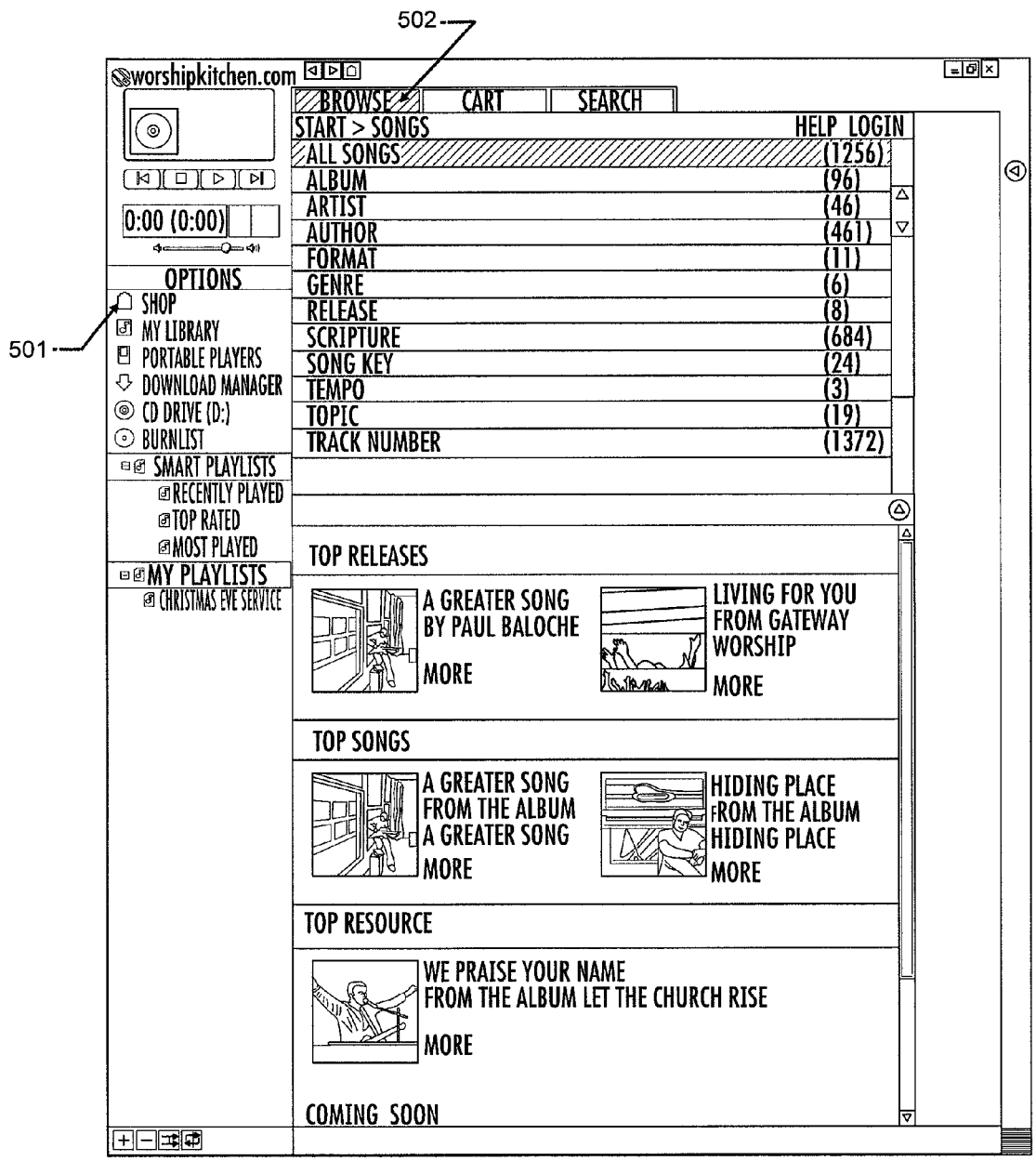

FIG. 5A is an example of an integrated store screen according to an embodiment of the invention.

Figure 5B:
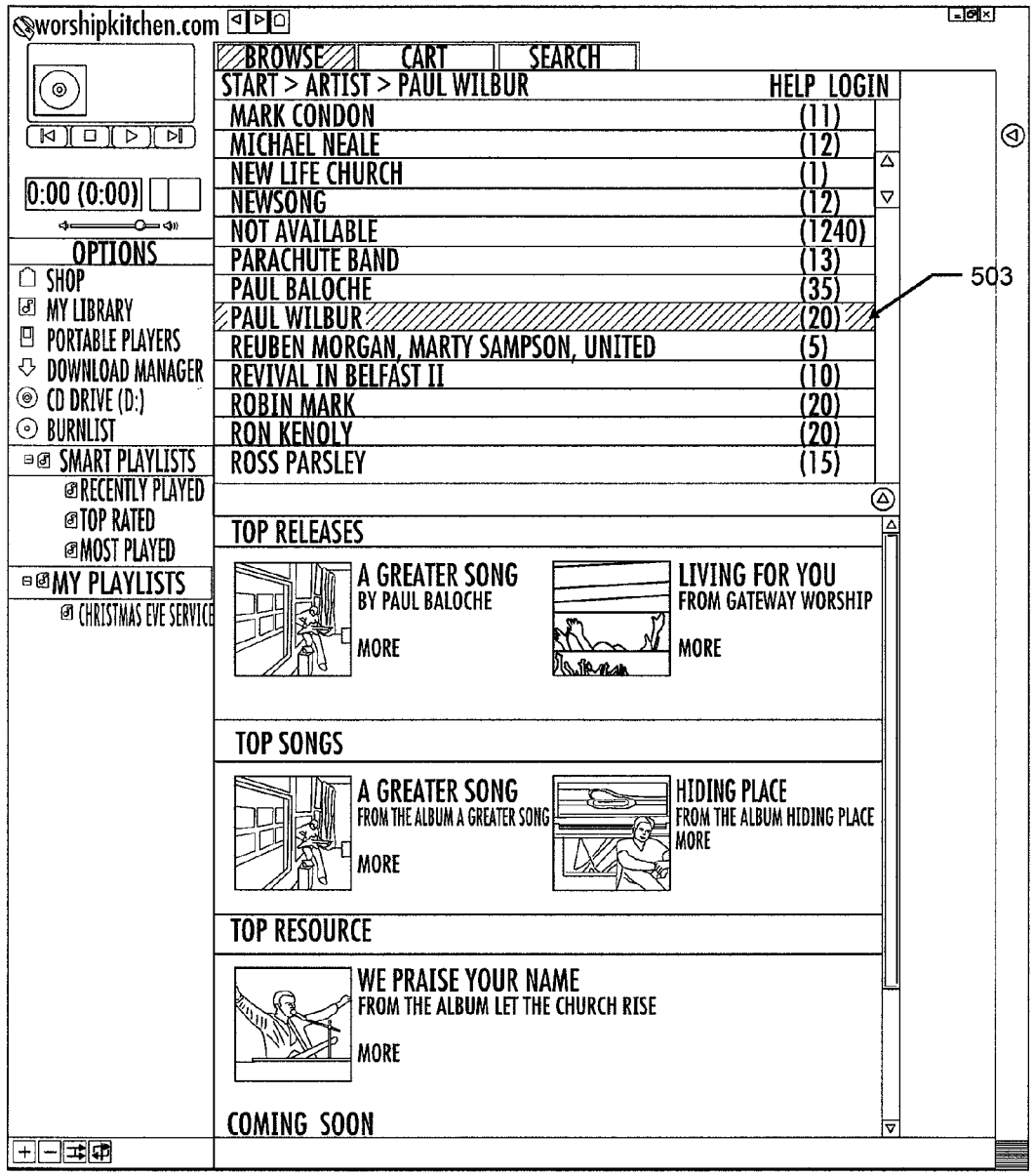

FIG. 5B is an example of using the "BROWSE" tab on the integrated store screen of FIG. 5A according to an embodiment of the invention.

Figure 5C:
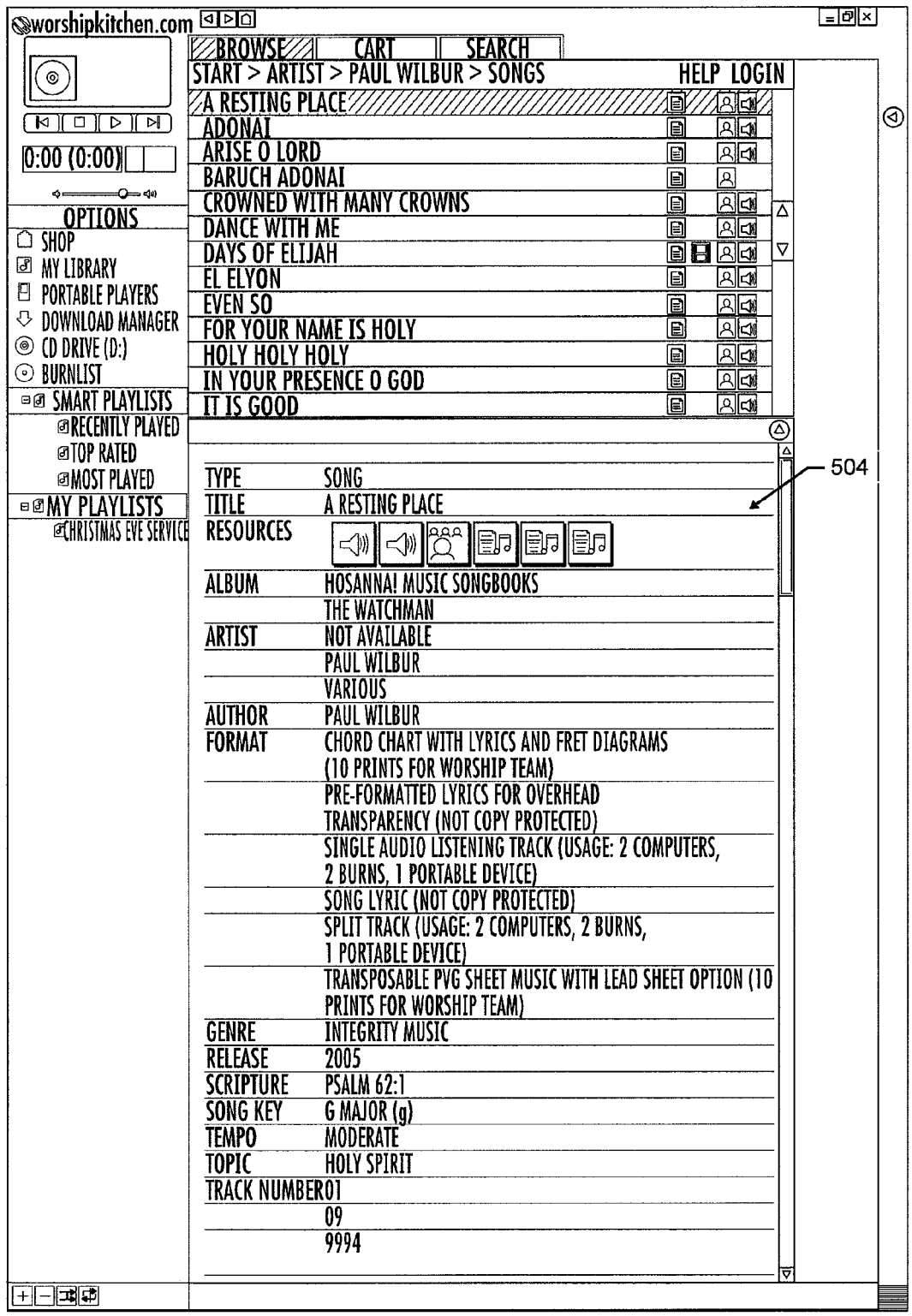

FIG. 5C is a further example of using the "BROWSE" tab on the integrated store screen of FIG. 5A according to an embodiment of the invention.

Figure 5D:
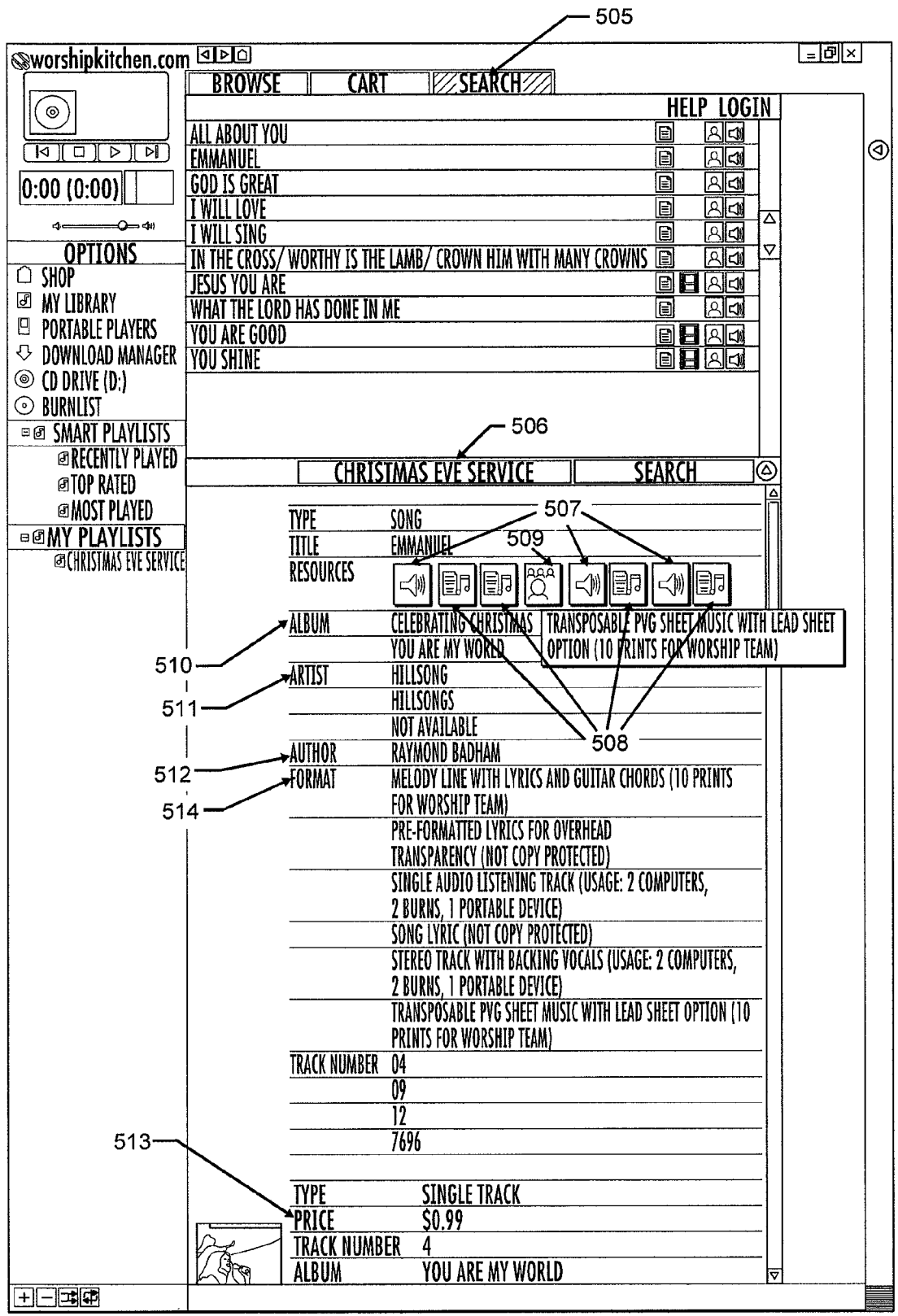

FIG. 5D is an example of using the "SEARCH" tab on the integrated store screen of FIG. 5A according to an embodiment of the invention.

Figure 6:
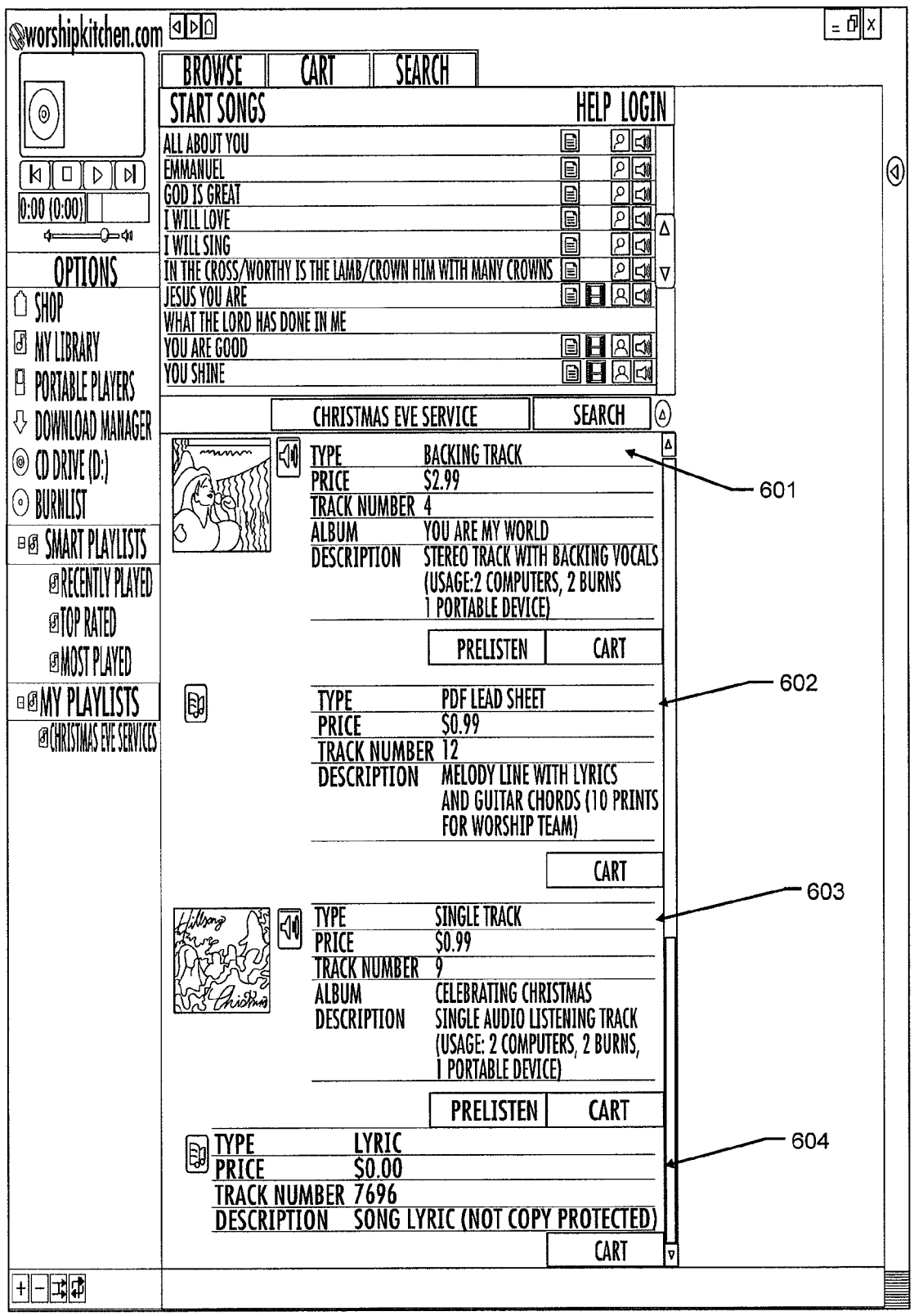

FIG. 6 is an example of a screen displaying various media resources available for a particular title according to an embodiment of the invention.

Figure 7:
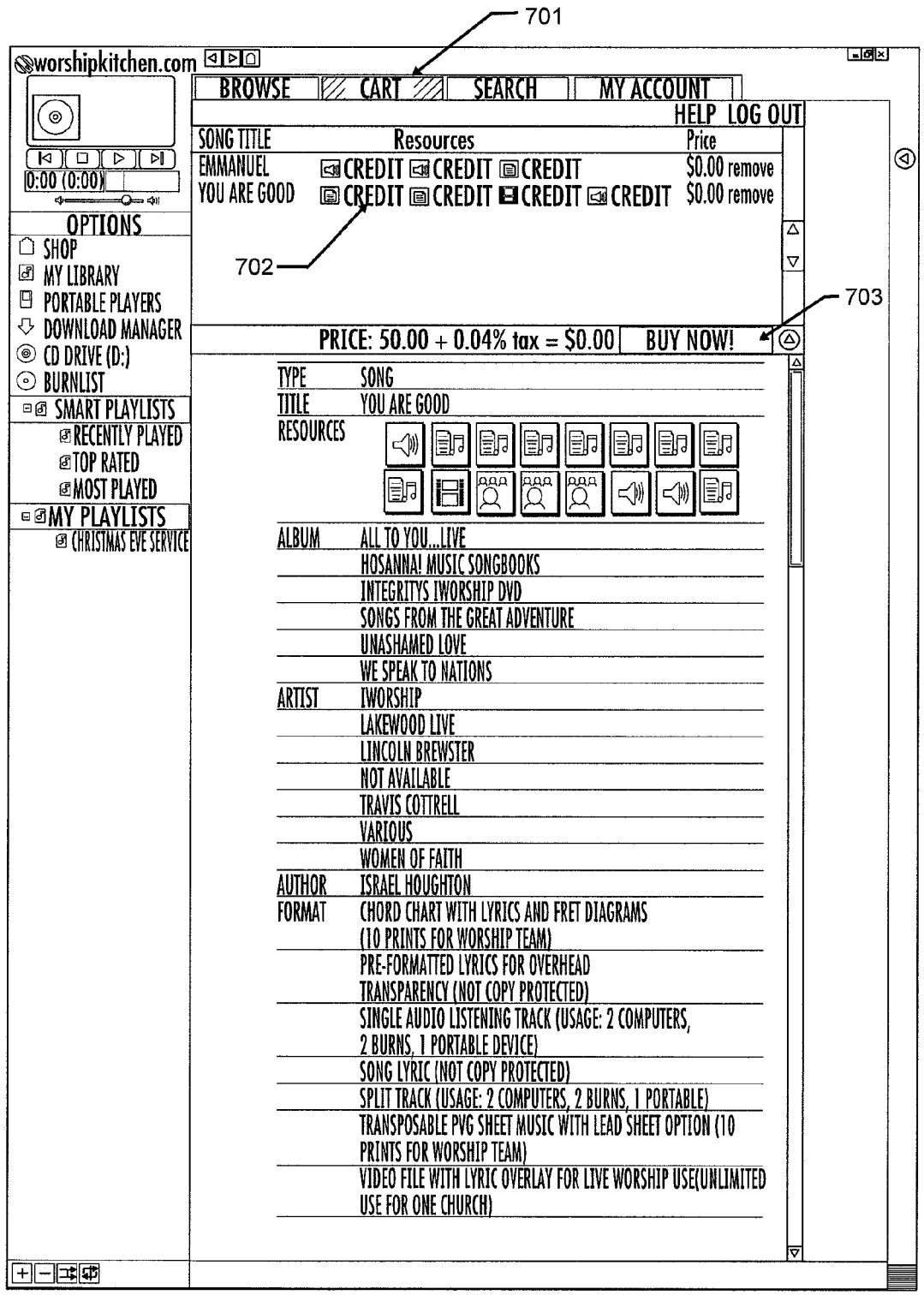

FIG. 7 is an example of a screen displaying various media resources selected for purchase under the "CART" tab according to an embodiment of the invention.

Figure 8:
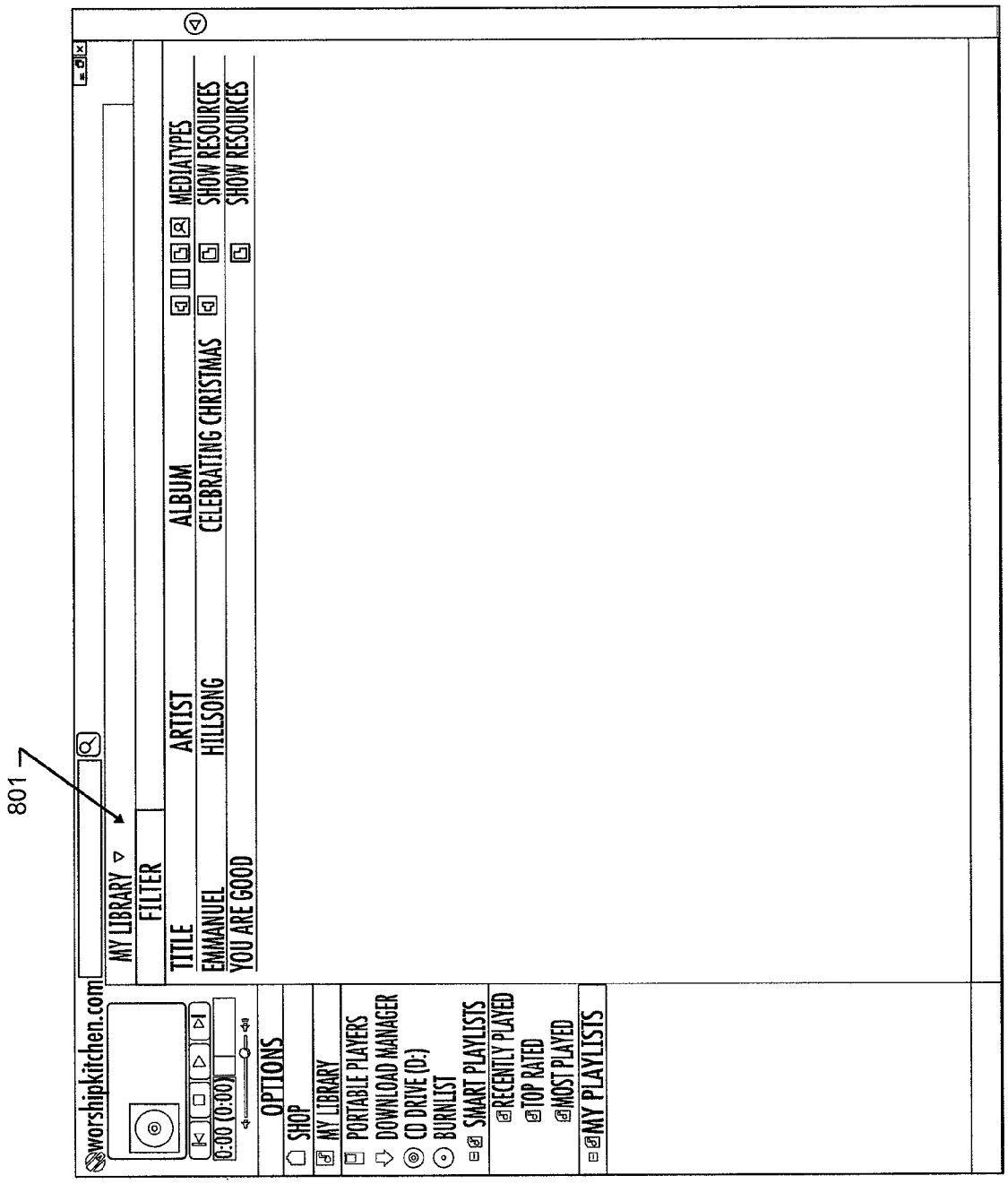

FIG. 8 is an example of a screen displaying a personal library of a user according to an embodiment of the invention.

Figure 9:
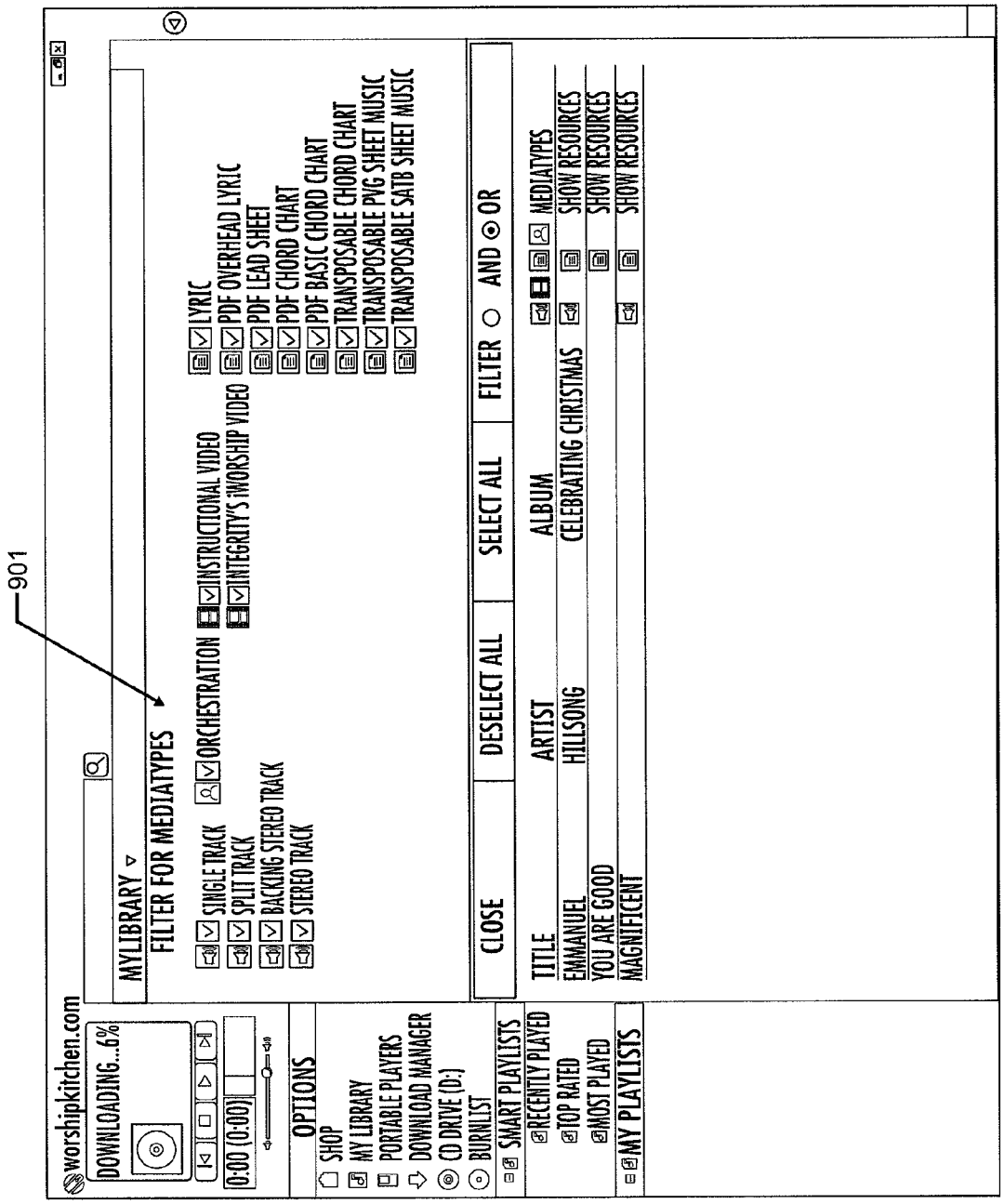

FIG. 9 is an example of a filter screen available in a personal library according to an embodiment of the invention.

Figure 10:
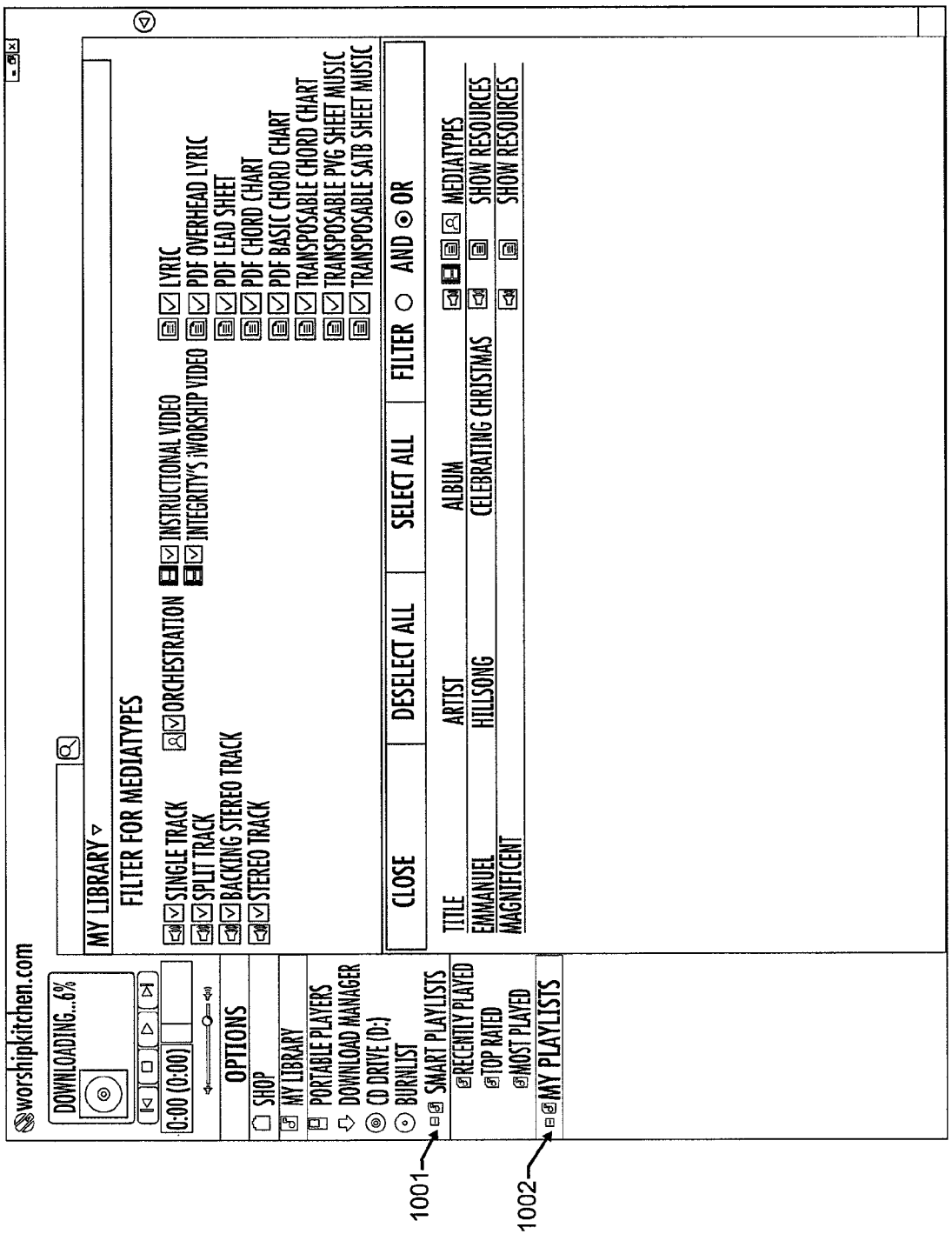

FIG. 10 is an example of a screen displaying playlists according to an embodiment of the invention.

DETAILED DESCRIPTION OF VARIOUS EMBODIMENTS OF THE INVENTION

Various embodiments of the present invention will now be described more fully hereinafter with reference to the accompanying figures, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

Brief Overview of Particular Embodiments of the Invention

A method, according to various embodiments of the invention, comprises the steps of: (1) providing a library (e.g., a digital library) of diverse types of media for use in the context of worship services; (2) providing an interface with a computer system (e.g., a web site on the Internet) through which a user searches the media library; (3) allowing the user to search the media library for diverse sets of media based on a theme (e.g., a particular biblical passage); and (4) allowing a user to select and purchase media displayed in the search results. In various embodiments, the media in the library may include, for example, music files (e.g., in a suitable digital or analog music file format such as .mp3 format), sheet music (e.g., in .pdf format or a suitable word processing format, such as MICROSOFT WORD® format), and/or video files (e.g., in a suitable digital or analog video file format, such as MPEG format). In further embodiments, the media stored in the library includes music that includes less than all of the instruments or vocal parts for a particular song. This music, and music that includes all of the applicable vocal and instrumental portions of the music may, for example, be in the form of digital music files stored in memory, or "hard" copies of the music in, for example, CD format.

In particular embodiments, the system is configured to automatically distribute the selected media to designated groups of individuals (e.g., all of the members of a particular band or worship group) upon purchase of the selected media. In various embodiments, the system is adapted to store a listing of each individual within each designated group of individuals, along with additional information, such as: (1) which instrument the person plays (including whether the person sings within the band); (2) if there are multiple parts for a particular instrument, which part the individual plays (e.g., lead guitar or rhythm guitar); and (3) how the individual wishes to receive delivery of media items (e.g., by having electronic versions of the items sent to him or her via e-mail, by downloading electronic versions of the item through a link to an appropriate web site, or by having "hard" copies of the items sent to them via regular, second-day or overnight mail).

In various embodiments, the system is configured to use the information above to distribute the selected media to individuals from particular groups in different pre-designated formats (e.g., the specified format for each individual that is stored in the system). For example, the system may be set up to (e.g., automatically) e-mail digital copies of any media purchased for use by a particular band to a first member of the band, and to coordinate the mailing of hard copies of the media to a second member of the band.

To use a particular embodiment of the invention, an individual (e.g., a member of the clergy) first logs on to a central computer system (e.g., via an appropriate Internet web site). The individual then enters, on a page of the web site, search criteria that is tailored to identify media to be used in a particular presentation (e.g., a church service). For example, if the theme of the church service will be Palm Sunday, the individual may use the term "Palm Sunday" as at least part of the search criteria.

In response, the system will search a library (e.g., a digital library) of available media for media that would be suitable for a Palm Sunday service. This may be done by matching the search criteria "Palm Sunday" with keywords that have been associated in advance with each media item within the digital library. Such keywords may include, for example: (1) themes associated with the media item (e.g., "Palm Sunday", "Easter", "Christmas", atonement, faith, or pride); (2) the type of media item (e.g., music, video, or sheet music); (3) a tempo associated with the media item (e.g., a fast-paced song may be indicated as having a "fast" tempo, and a slow song may be indicated as having a "slow" tempo); or (4) any other suitable information that would describe the theme or content of the media item.

Next, the system returns results that satisfy the individual's search criteria. The individual may then select particular media items for use in a particular service in any suitable manner (e.g., by selecting the items to add the items to the user's "shopping cart"). The individual may continue this process until, for example, they have assembled all of the media items that they need for their presentation (e.g., church service).

Next, the individual may designate a group of individuals to receive the items. For example, the individual may indicate, using a particular screen of the web site, that each member of a particular worship group (or a designated subset of the members within the worship group) should receive all of the items (or a designated subset of the items) selected by the individual. The individual may then request (e.g., by selecting a designated "button" on the web page) that the items be distributed to the various individuals in the worship group according to the individual's designated distribution method. An account associated with the individual (e.g., the individual's credit card account) may then be charged an appropriate fee for the distributed items.

For example, for a particular service, a minister might select four songs to be performed by a guitar player and a vocalist within a particular worship group. In this example, the guitar player may have requested to receive paper copies of sheet music via U.S. mail, and the vocalist may have requested to receive electronic copies of the sheet music in .pdf format via e-mail. In particular embodiments, these preferences are saved in the system's memory, and the system is adapted to facilitate (e.g., automatically) the distribution of copies of all four songs to the guitar player and the vocalist according to their preferences. For example, the system may e-mail .pdf copies of the sheet music for all four songs to the vocalist, and may place an order to have paper copies of the sheet music for all four songs sent to the guitar player via U.S. mail.

More Detailed Discussion

It should be understood in light of this disclosure that various embodiments of the present invention may be in the form of a method, a data processing system, or a computer program product. Accordingly, the present invention may take the form of an entirely hardware embodiment, an entirely software embodiment, or an embodiment combining software and hardware aspects. Furthermore, various embodiments of the present invention may take the form of a computer program product on a computer-readable storage medium having computer-readable program instructions (e.g., computer software) embodied in the storage medium. More particularly, various embodiments of the present invention may take the form of web-implemented computer software. Any suitable computer-readable storage medium may be utilized including hard disks, CD-ROMs, DVD-ROMs, USB flash drives, optical storage devices, or magnetic storage devices.

Various embodiments of the present invention are described below with reference to block diagrams and flowchart illustrations of methods, apparatuses (e.g., systems) and computer program products according to an embodiment of the invention. It should be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Various embodiments of the present invention provide systems and methods for integrating and managing a plurality of media resources used for worship services. Various embodiments involve providing a library of diverse types of media resources for use in the context of worship services, and an interface with a computer system through which a user may search the library. Specifically, various embodiments allow a user to search the library for diverse sets of media resources based on one or more factors (e.g., song theme, media type, and/or song tempo) and to select and purchase one or more media resources displayed in the diverse sets of media resources.

System Architecture

FIG. 1 depicts an exemplary embodiment of a system for distributing media resources used for worship services. In this embodiment, the system is based on a web-based application wherein a user downloads and installs an interface 101 on his or her personal computer 102 to interact with the system. For example, in various embodiments, a user may access the system via a web site and, on the web site, register for a service associated with the system. Generally speaking, this service provides the user with an account that enables the user to access and download media resources from the system's library of files (e.g., the system's media file library).

The available service may provide a number of options for the user, as shown in FIG. 2. For example, the user may choose Plan A Level, Plan B Level, or an la carte Level as shown in FIG. 2. The number of options and provided services may vary among embodiments as will be apparent to those of ordinary skill in the art in light of this disclosure.

After a user signs up for a particular service, the system provides the user with a link through which the user may download an appropriate user interface 101, as shown in FIG. 1. Once the user has downloaded and installed the interface 101, an icon is provided on the user's tool bar and/or desktop, thereby making it easy for the user to access the interface 101 by simply clicking on the icon.

In addition, the interface provides three separate modules for use with the system according to various embodiments of the invention. As shown in FIG. 1, these modules include, in particular embodiments, an integrated store 103, a personal library 104, and a ministry management tool 105. Generally, the integrated store 103 is used to interface with a library of media resources associated with the system. In particular embodiments, the integrated store 103 is adapted to allow users to browse and purchase resources from the system's media library. In particular embodiments, the personal library 104 is provided to the user and allows the user to store and organize their purchased media resources. In various embodiments, the ministry management tool 105 allows the user to integrate and manage media resources, and in addition, manage a worship team. These three modules are discussed in further detail below.

In various embodiments, the interface 101 provides a link to the library of media resources via the Internet. Specifically, the interface 101 communicates with a web server 106 associated with the system, e.g., negotiates the exchange of data with the web server 106. In turn, the web server 106 is adapted to accept requests from users via the interface 101 and to provide responses along with data content to the interface 101.

Thus, for example, a user brings up the interface 101 and clicks on the integrated store 103 to browse for a song and enters search criteria to find the song. A request along with the specific search criteria are sent to the web server 106 and the server 106 receives the request and forwards the request on to an application server 107.

In various embodiments, the application server 107 is adapted, not only to apply any business logic associated with the system, but also to facilitate access to data stored within the system, e.g., access to the media resources found in the system's library. In a particular embodiment, the application server 107 receives particular requests along with particular search criteria and the server 107 queries the system's library for any media resources that match the search criteria.

In various embodiments, the library is provided as a database 108, as shown in the system depicted in the FIG. 1. More specifically, the library may comprise a database 108 of pointers, wherein each pointer provides the path to a specific media resource and the media resources are stored as files in a digital product storage 109, e.g., in memory of one or more servers that are remote from or the same as the server on which the database 108 is housed. However, various other embodiments may store the media resources in various other ways. For example, the resources may be stored directly in the database 108, either by parsing each media resource into smaller segments to better utilize space in the database 108 or by simply storing the entire resource as a single entry. In another embodiment, the library may simply be a directory architecture that provides a number of directories and the media resources are files that are stored in the directories within the directory architecture. The directory architecture may be set up based on a hierarchy so that files may be easily located. One of ordinary skill in the art can envision several different approaches to storing the media resources in light of this disclosure.

Thus, the database 108 receives the query along with the search criteria and returns the results, e.g., list of songs that "match" the search criteria, to the application server 107. The application server 107 then forwards the results to the web server 106, and the web server 106 forwards the results to the user interface, and more specifically to the integrated store module 103.

FIG. 3 shows a schematic diagram of a typical user's personal computer or system running the interface 101 as described above according to one embodiment of the invention. The system 95 includes a processor 60 that communicates with other elements within the computer system via a system interface or bus 61. Also included in the system 95 is a display device/input device 64 for receiving and displaying data. This display device/input device 64 may be, for example, a keyboard or pointing device that is used in combination with a monitor. The system 95 further includes memory, which includes both read only memory (ROM) 65 and random access memory (RAM) 67. The system's ROM 65 is used to store a basic input/output system 26 (BIOS), containing the basic routines that help to transfer information between elements within the system 95. Alternatively, the user's personal computer or system 95 can operate on one computer or on multiple computers that are networked together.

In addition, the system 95 includes at least one storage device 63, such as a hard disk drive, a floppy disk drive, a CD ROM drive, a DVD ROM drive, a USB flash drive, or optical disk drive, for storing information on various computer-readable media, such as a hard disk, a removable magnetic disk, a CD-ROM disk, or a DVD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

The program modules discussed above along with various other program modules may be stored by the various storage devices and within RAM 67. For example, as shown in FIG. 3, the program modules of the system 95 include an operating system 80 and the modules associated with the Worship-Kitchen interface 101, e.g., the integrated store module 103, the personal library module 104, and the ministry management tool module 105. The integrated store module 103, the library module 104, and the ministry management tool module 105 control certain aspects of the operation of the system 95, as is described in more detail below, with the assistance of the processor 60 and an operating system 80.

Also located within the system 95 is a network interface 74, for interfacing and communicating via a network (e.g., Internet or private network) with other elements of a computer network, such as the web server 106 of the system displayed in FIG. 1. It will be appreciated by one of ordinary skill in the art that one or more of the system's components 95 may be located geographically remotely from other system components. Furthermore, one or more of the components may be combined, and additional components performing functions described herein may be included in the system 95.

Process for Distributing Media Resources

An exemplary process for distributing media resources used for worship services 400 is shown in FIG. 4. Reference is made to the system detailed above in FIG. 1 to help describe the process for distributing media resources used for worship services detailed below. However, the system is used for purposes of providing an example of how the process can be carried out in various embodiments and in no way should be construed as the only way to practice the process detailed below.

Accordingly, various embodiments of the invention may begin with providing a library of diverse types of media resources, as shown in Step 401 of FIG. 4. In various embodiments, this library comprises various types of media resources that can be utilized for worship services. For example, the media resources in the library may include songs, sheet music, videos, chord charts, lyric sheets, vocal tracks, lead sheets, and/or choir arrangements. In addition, the media resources may be in a digital format in various embodiments, although non-digital formats may be used in other embodiments. Thus, when an individual is planning a worship service, the individual may decide on a particular hymn that he or she wishes the congregation to perform during the service. The individual is then able to go to the library to find the sheet music for the hymn or the choir arrangement if instead the choir is to perform the hymn during the service.

In addition, the library can be provided in several different forms in various embodiments. For example, in one embodiment, the library may be a database 106 as previously discussed in regard to the system detailed in FIG. 1. In addition, in various embodiments, the media resources are organized in the library based on a theme, a resource type, or both to facilitate easier searching of the resources. For example, the files within the database may be organized based on factors such as the album with which a particular file (e.g., a music file) is associated, an artist associated with the file (e.g., the artist performing a particular song), author (e.g., the author of a particular song), scripture (e.g., scripture that is associated with a particular music file), tempo (e.g., the tempo of a song), and/or topic (e.g., the topic of the lyrics of a particular song). Lastly, the content of the library may be provided from several different sources in various embodiments. For instance, partnerships may be formed with various distributors of worship service media resources so that the library content is the most currently available in the market.

In Step 402, the process for distributing media resources used for worship services 400 further provides an interface 101 with a computer system through which a user may search the library. In various embodiments, this interface 101 provides an intuitive, integrated download store to easily find and buy media resources stored in the library. In various embodiments, the interface 101 is an application that is downloaded onto the user's computer as described in the system previously discussed in FIG. 1. In other embodiments, the interface 101 may simply be a web browser that is used to interface with various web pages. For example, FIGS. 5A-10 provide examples of such screens of the interface 101 according to an embodiment of the invention. The user clicks on "SHOP" 501 under "OPTIONS" as shown on the left side of the screen in FIG. 5A, which brings up various categories of available media, such as top releases, top songs, and top resource.

The user may then browse and search the library for diverse sets of media resources as shown in Step 403 of FIG. 4. For instance, in one embodiment, the user is provided with a listing of themes that may guide the user as he or she browses the media resources as shown under the "BROWSE" tab 502 in FIG. 5A. The user may be interested in a particular artist and therefore will use the artist listing to bring up a listing of a particular artist such as Paul Wilbur 503 shown in FIG. 5B available in the media resource library and further scale down to a particular media file of interest, such as "A Resting Place" 504 shown in FIG. 5C.

In addition, the user may also click on the "SEARCH" tab 505 located along the top of the screen to bring up a search tool as shown in FIG. 5D. Under this tab 505, the user can enter search criteria to search the library for diverse sets of media resources based on a theme. In various embodiments, the theme may simply be a title of a particular song or artist, similar to the listing of themes provided under the "BROWSE" tab 502. In other embodiments, the theme may be tailored to identify media to be used in a particular event (e.g., a worship service).

For example, if the theme of the upcoming worship service is Christmas Eve, the individual may use the term "CHRISTMAS EVE SERVICE" 506 as at least part of the search criteria. In response, the library of media resources is searched for songs (or other media) that would be suitable for the Christmas Eve service. This may be done by matching the search criteria "CHRISTMAS EVE SERVICE" 506 with keywords that have been associated in advance with one or more media files within the system's media library. Such keywords may include, for example: (1) themes associated with the media files (e.g., "Christmas Eve," "Christmas," "Birth of Jesus," or "Noel"); (2) the type of media resources available for a particular song or other media (e.g., music, video, or sheet music); (3) tempo indicators that are associated with one or more of the media files in the library (e.g., a fast-paced song may be indicated as having a "fast" tempo, and a slow song may be indicated as having a "slow" tempo); or (4) any other suitable information that would describe the theme or content of the media file.

Next, the system returns results that satisfy the individual's search criteria. An example of search results is shown listed at the top of FIG. 5D. In this example, the titles listed are available in various formats (i.e., types of media resources), such as MP3 music files 507, sheet music 508, and videos 509. In addition, other types of media resources may also be available in various embodiments such as chord charts, choir arrangements, vocal tracks, and lead sheets. As will be apparent to one of ordinary skill in the art in light of this disclosure, various resource types may be made available in various embodiments.

Also shown in FIG. 5D, additional information may be provided once a title is selected. Such information may include, for example, the album name the song is available on 510, the artist performing the song 511, the author of the song 512, and the price to purchase the song 513. In addition, the formats 514 available for the title may be provided. For example, in FIG. 5D, the formats 514 available for the song "Emmanuel" include the melody line with lyrics and guitar chords, pre-formatted lyrics, single audio listening track, song lyric, stereo track with backing vocals, and/or transposable PVG sheet music.

In Step 404, the process 400 further includes allowing the user to select and purchase one or more of the displayed files. As previously discussed, in various embodiments, once a title has been selected, a user can see each media type available for the title. For example, the user may select the song "Emmanuel" and the integrated store will show that the backing track 601, lead sheet 602, single track 603, and lyric 604 for the song Emmanuel are available for purchase, as shown in FIG. 6.

In various embodiments, once the user has selected one or more desired media files, the user clicks on the "CART" tab 701 to go to a download screen and views the user's selected files and the associated prices as shown in FIG. 7. Some files may show "CREDIT" 702 rather than a price, as they may be free downloads or part of a membership plan. The user can review his or her selections and click the download button, e.g., "BUY NOW" button 703. After the download is complete, the resource will appear in the My Library section 801 of the software, as shown in FIG. 8.

In various embodiments, a personal library 104, e.g., My Library, is provided that is adapted for storing and organizing the media resources purchased by the user. In addition, various embodiments provide tools so that the user may view, sort, and organize all his or her purchased resources. For example, one embodiment provides a filter tool 901 that allows the user to filter out particular types of media resources as shown in FIG. 9. In another embodiment, the resources are also organized based on theme. This allows the user to search the resources easily while planning a worship service.

In addition, various embodiments provide a link in the personal library associated with a particular title to allow the user to access additional resources related to the particular title via the link. Thus, if a user selects a song in her personal library and determines she needs the sheet music, she can select the link associated with the song and the link accesses any additional resources related to the song that are available in the media resource library via the integrated store 103.

Another feature of the personal library 104 in various embodiments of the invention is that it also provides a tool that allows a user to add his or her resources not obtained via the integrated store and media resource library. Therefore, if a user has MP3 audio files on his or her personal computer, the user can load these MP3 files into their personal library 104. This allows the user to store and organize all his or her resources used for worship services together.

Furthermore, various embodiments of the invention allow the user to purchase and distribute media resources to one or more individuals. For example, the user may indicate, using a particular screen, that each member of a particular worship group (or a designated subset of the members within the worship group) should receive all the media resources (or a designated subset of the media resources) selected by the user. The user may then request (e.g., by selecting a designated "button" on the screen) that the resources be distributed to the various individuals in the worship group according to the individual's designated distribution method. For example, the media resources may be distributed by e-mailing the resources, downloading the resources, providing a link to the resources, or physically mailing a copy of the resources, or any combination thereof to the one or more individuals. As a result, an account associated with the user (e.g., the user's credit card account) may then be charged an appropriate fee for the distributed media resources in various embodiments.

An example of such a screen may be provided in various embodiments through the ministry management tool 105 referenced in the system detailed above in FIG. 1. The ministry management tool 105 allows a user to coordinate the schedules of a worship team (e.g., a band that plays spiritual music) and send worship plans and resources to each member of the team as needed. Thus, the ministry management tool 105 of various embodiments allows the user to enter and store information about individuals (e.g., worship team members) along with preferences on how each individual would like to receive resources. Additional information about individuals may also include which instrument the individual plays (including whether the individual sings with a band), and if there are multiple parts for a particular instrument, which particular part the individual plays (e.g., lead guitar or rhythm guitar). Therefore, the distribution of the various items can be automated in various embodiments so that once the user has selected a resource and indicated what individuals should receive the resource, such as all the members of a particular band or worship group, the ministry management tool 105 reads the individual's preference, coordinates sending the resource to the particular individual based on the individual's preference, and sends the individual a notification, such as an e-mail, text message, or letter indicating that the resource has been sent to them. The resource is then retrieved (e.g., from the system's media library) and sent to the individual via the preferred method for receiving the resource. Finally, the account associated with the user is charged the appropriate fee for the distributed resource.

For example, for a particular service, a minister may select four songs to be performed by a guitar player and a vocalist within a particular worship group. In this example, the guitar player may have requested to receive copies of the sheet music via U.S. mail, and the vocalist may have requested to receive copies of the sheet music in PDF format via e-mail. In particular embodiments, these preferences are saved in the ministry management tool 105 or user's personal library 104, and the process further facilitates the distribution of copies of all four songs to the guitar player and the vocalist according to their preferences. Thus, the process may facilitate e-mailing the PDF copies of the sheet music for all four songs to the vocalist, and may facilitate having an order placed to have paper copies of the sheet music for all four songs sent to the guitar player via U.S. mail.

Lastly, various embodiments also provide smart playlists 1001, as shown in FIG. 10. These smart playlists are automatically created for the user's quick reference. In addition, various embodiments allow a user to create and save their own playlists as shown under My Playlists 1002 in FIG. 10. A user can create a new playlist and simply drag and drop resources from their personal library 104 into the playlist. Thus, a user can create a playlist that corresponds to a particular worship service. For example, the pastor of a church may create a playlist to use for the Christmas Eve service and save the list so that he or she may re-use the list each year for the service. This can save valuable time for the pastor each year in preparing for the service. These playlists can be transferred to any compatible MP3 player, saved to disk, or e-mailed through the management tool 105 in various embodiments of the invention.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended inventive concepts. Although specific terms are employed herein, they are used in a generic and descriptive sense only and not for purposes of limitation.

That which is claimed is:

1. A computer system for distributing media files, said computer system comprising:
    memory storing a library of diverse types of media files; and
    a computer user interface through which a user performs a search for particular files within said library of media files, wherein:
        said library comprises both music files and sheet music files;
        a first of said music files comprising a first accompaniment version of a particular song, said first accompaniment version of said particular song being a version of said particular song in which a first subset of at least one instrument part included on an original version of said particular song is omitted from said first accompaniment version;
        at least one of said sheet music files comprising sheet music for at least one of said first subset of one or more instrument parts for said particular song; and
        said computer system is configured to:
            store information regarding a first band member instrument, said first band member instrument being played by a first member of a particular band;
            store information regarding a second band member instrument, said second band member instrument being played by a second member of said particular band;
            facilitate a purchase, by said user, of one or more of said media files identified in said search and associated with said particular song;
            distribute said accompaniment version of said particular song to both said first band member and said second band member;
            distribute a first of said sheet music files to said first band member, said first sheet music file corresponding to said first band member instrument; and
            distribute a second of said sheet music files to said second band member, said second sheet music file corresponding to said second band member instrument.

2. The system of claim 1, wherein said first subset of at least one instrument part included on said original version of said song comprises instrument parts for both said first band member instrument and said second band member instrument.

3. The system of claim 1, wherein said system is configured to execute, in response to a single user request, said steps of: (A) distributing said accompaniment version of said particular song; (B) distributing said first sheet music file; and (C) distributing said second sheet music file.

4. The system of claim 3, wherein said single user request is a request to distribute said song to said band.

5. The system of claim 1, wherein said system is configured to execute said step of distributing said accompaniment version of said particular song by e-mailing said accompaniment version of said particular song to said first and second band members.

6. The system of claim 5, wherein said system is configured to execute said step of distributing said first sheet music file to said first band member by e-mailing said first sheet music file to said first band member.

7. The system of claim 1, wherein said system is configured to execute said step of distributing said accompaniment version of said particular song by:
   e-mailing a digital copy of said accompaniment version of said particular song to said first band member; and
   facilitating the mailing of a hard copy of said accompaniment version of said particular song to said second band member.

8. The system of claim 7, wherein said system is configured to:
   execute said step of distributing said first sheet music file to said first band member by e-mailing a digital copy of said first sheet music file to said first band member; and
   execute said step of distributing said second sheet music file to said second band member by facilitating the mailing of a hard copy of said second sheet music file to said second band member.

9. The system of claim 8, wherein said system is configured for:
   storing a file format preference for said first band member indicating that said first band member wishes to receive files via e-mail; and
   storing a file format preference for said second band member indicating that said second band member wishes to receive files via mail.

10. The system of claim 1, wherein said library comprises music files, video files and sheet music files.

11. The system of claim 1, wherein
   (a) said system is configured to search said library of media files based on search criteria selected from a group consisting of: theme, passage of religious text, and tempo, and (b) said search criteria is provided by said user.

12. The system of claim 11, wherein in response to said user selecting a theme, said system is configured to search said library of media files based on said theme.

13. The system of claim 11, wherein in response to said user selecting a passage of religious text, said system is configured to search said library of media files based on the passage of religious text.

14. The computer system of claim 11, wherein in response to said user selecting a tempo, said system is configured to search said library of media files based on said tempo.

15. The system of claim 1, wherein:
   said information comprises a designated format preference and designated contact information for said first band member and said second band member; and
   said system is further configured to, in response to receiving a request to distribute said accompaniment version of said particular song to said first band member and said second band member, distribute said accompaniment version of said particular song to said first band member and said second band member based on said contact information and said format preference for said first band member and said second band member.

16. The system of claim 15, wherein said contact information for at least one of said first band member or said second band member comprises an e-mail address.

17. The system of claim 16, wherein said contact information for at least one of said first band member or said second band member comprises a physical address.

18. The system of claim 17, wherein:
   said format preference for at least one of said first band member or said second band member comprises a digital copy preference;
   said format preference for at least one of said first band member or said second band member comprises a hard copy preference; and
   said system is configured for:
      distributing said accompaniment version of said particular song to at least one of said first band member or said second band member by e-mailing a copy of said accompaniment version of said particular song to at least one of said first band member or said second band member at said e-mail address; and
      distributing said accompaniment version of said particular song to at least one of said first band member or said second band member by facilitating the mailing of a hard copy of said accompaniment version of said particular song to at least one of said first band member or said second band member at said physical address.

19. The system of claim 18, wherein said types of media files comprise songs, sheet music, videos, chord charts, lyric sheets, vocal tracks, lead sheets, and choir arrangements.

20. A computer system for distributing media files, said computer system comprising:
   memory storing a library of diverse types of media files; and
   a computer user interface through which a user performs a search for particular files within said library of media files, wherein:
      said library comprises both music files and sheet music files; and
      a first of said music files comprising a first accompaniment version of a particular song, said first accompaniment version of said particular song being a version of said particular song in which a first subset of at least one vocal part included on an original version of said song is omitted from said first accompaniment version;
      at least one of said sheet music files comprising sheet music for at least one of said first subset of one or more vocal parts for said particular song; and
      said computer system is configured to:
         store information regarding a first member vocal part, said first member vocal part being sung by a first member of a particular musical group;
         store information regarding a second member vocal part, said second member vocal part being sung by a second member of said particular musical group;
         facilitate a purchase, by said user, of one or more of said media files identified in said search and associated with said particular song;
         distribute said accompaniment version of said particular song to both said first member and said second member;

distribute a first of said sheet music files to said first member, said first sheet music file corresponding to said first member vocal part; and distribute a second of said sheet music files to said second member, said second sheet music file corresponding to said second member vocal part.

21. The system of claim 20, wherein said first subset of at least one vocal part included on said original version of said particular song comprises both said first member vocal part and said second member vocal part.

22. The system of claim 20, wherein said system is configured to execute, in response to a single user request, said steps of: (A) distributing said accompaniment version of said particular song; (B) distributing said first sheet music file; and (C) distributing said second sheet music file.

23. The system of claim 22, wherein said single user request is a request to distribute said particular song to said musical group.

24. The system of claim 20, wherein said system is configured to execute said step of distributing said accompaniment version of said particular song by e-mailing said accompaniment version of said particular song to said first and second members.

25. The system of claim 24, wherein said system is configured to execute said step of distributing said first sheet music file to said first member by e-mailing said first sheet music file to said first member.

26. The system of claim 20, wherein said system is configured to execute said step of distributing said accompaniment version of said particular song by:

e-mailing a digital copy of said accompaniment version of said particular song to said first member; and facilitating the mailing of a hard copy of said accompaniment version of said particular song to said second member.

27. The system of claim 24, wherein said system is configured to:

execute said step of distributing said first sheet music file to said first member by e-mailing a digital copy of said first sheet music file to said first member; and execute said step of distributing said second sheet music file to said second member by facilitating the mailing of a hard copy of said second sheet music file to said second member.

28. The system of claim 27, wherein said system is configured for:

storing a file format preference for said first member indicating that said first member wishes to receive files via e-mail; and storing a file format preference for said second member indicating that said second member wishes to receive files via mail.

29. The system of claim 20, wherein said library comprises music files, video files and sheet music files.

30. A computer-implemented method for distributing media files, said method comprising the steps of:

storing a library of diverse types of media files in memory, said library comprising both music files and sheet music files, and a first of said music files comprising a first accompaniment version of a particular song, said first accompaniment version of said particular song being a version of said particular song in which a first subset of at least one instrument part included on an original version of said particular song is omitted from said first accompaniment version, and at least one of said sheet music files comprising sheet music for at least one of said first subset of one or more instrument parts for said particular song;

storing information regarding a first band member instrument, said first band member instrument being played by a first member of a particular band;

storing information regarding a second band member instrument, said second band member instrument being played by a second member of said particular band;

facilitating a purchase, by a user over a computer user interface, of one or more of said media files associated with said particular song; and after said purchase of said one or more of said media files:

distributing said accompaniment version of said particular song to both said first band member and said second band member;

distributing a first of said sheet music files to said first band member, said first sheet music file corresponding to said first band member instrument; and distributing a second of said sheet music files to said second band member, said second sheet music file corresponding to said second band member instrument.

31. A computer system for distributing media files, said computer system comprising:

memory storing a library of diverse types of media files; and at least one computer processor, wherein:

said library comprises both music files and sheet music files;

a first of said music files comprising a first accompaniment version of a particular song, said first accompaniment version of said particular song being a version of said particular song in which a first subset of at least one instrument part included on an original version of said particular song is omitted from said first accompaniment version;

at least one of said sheet music files comprising sheet music for at least one of said first subset of one or more instrument parts for said particular song; and said at least one computer processor is configured to:

store information regarding a first band member instrument, said first band member instrument being played by a first member of a particular band;

to facilitate a purchase, by a user, of one or more of said media files associated with said particular song; and after said purchase of said one or more of said media files:

distribute said accompaniment version of said particular song to said first band member; and distribute a first of said sheet music files to said first band member, said first sheet music file corresponding to said first band member instrument.

32. The system of claim 31, wherein said at least one computer processor is configured to:

store information regarding a second band member instrument, said second band member instrument being played by a second member of said particular band; and after said purchase of said one or more of said media files:

distribute said accompaniment version of said particular song to said second band member; and distribute a second of said sheet music files to said second band member, said second sheet music file corresponding to said second band member instrument.

* * * * *

UNITED STATES PATENT AND TRADEMARK OFFICE
CERTIFICATE OF CORRECTION

| | | |
|---|---|---|
| PATENT NO. | : 8,090,795 B2 | |
| APPLICATION NO. | : 12/236856 | |
| DATED | : January 3, 2012 | |
| INVENTOR(S) | : Manwaring et al. | |

It is certified that error appears in the above-identified patent and that said Letters Patent is hereby corrected as shown below:

Column 13

Line 56, delete "computer"

Column 14

Line 44, delete "and"

Signed and Sealed this
Thirteenth Day of March, 2012

David J. Kappos
*Director of the United States Patent and Trademark Office*